H. C. MASTERS.
SHAFT BEARING.
APPLICATION FILED JULY 7, 1915.
1,219,978.
Patented Mar. 20, 1917.
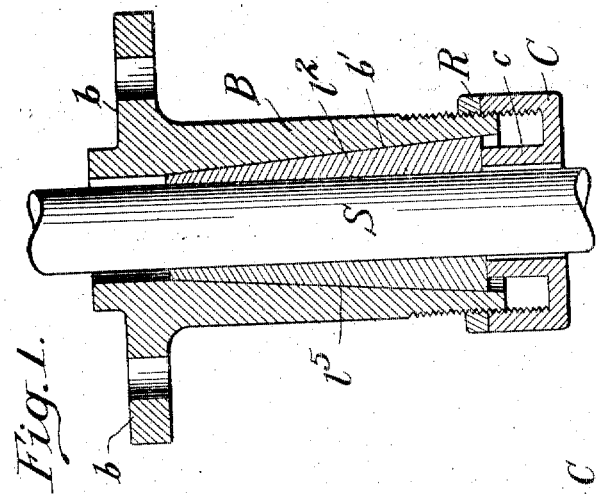
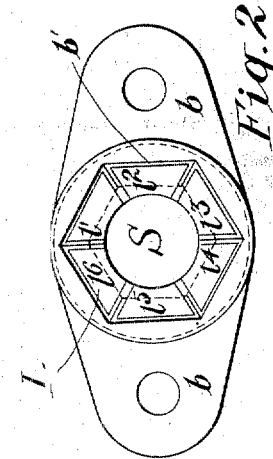
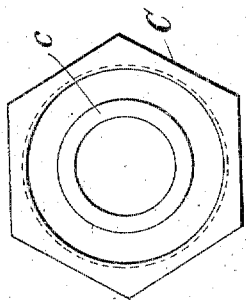
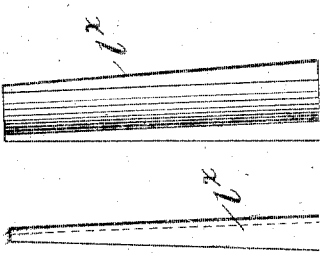
Inventor
Henry Clarendon Masters
By Edward E. Clement
Attorney

UNITED STATES PATENT OFFICE.

HENRY CLARENDON MASTERS, OF HAMILTON, BERMUDA.

SHAFT-BEARING.

1,219,978.　　　　Specification of Letters Patent.　　Patented Mar. 20, 1917.

Application filed July 7, 1915.　Serial No. 48,523.

*To all whom it may concern:*

Be it known that I, HENRY CLARENDON MASTERS, a subject of the King of Great Britain, residing at Hamilton, Bermuda, have invented certain new and useful Improvements in Shaft-Bearings, of which the following is a specification, reference being had therein to the accompanying drawing.

My invention relates to shaft bearings and has particular reference to the stern bearings of power driven vessels.

The object of my invention is to produce a bearing which shall be simple, economical to manufacture, easy to adjust and keep tight, uniform and smooth in respect to its bearing surfaces, and durable, as well as efficient throughout its entire life.

I attain my objects by making the casing or journal box of metal with its outside of indeterminate or any desired shape, and an internal bore polygonal in section and longitudinally tapering. In this box I insert a sectional bearing sleeve or liner, tapered to fit the taper of the box, and otherwise shaped so as to have the same cross section as the bore thereof. This sleeve is split longitudinally into equal parts, the division planes passing through the axis of the bearing and bisecting the external angles of the polygonal figure in the bore.

By this construction I produce a number of sectional slips, all exactly alike, and each tapered on every face. The result is when a sufficient number of these slips is assembled and inserted in the box around the shaft, they only need to be pressed home in order to automatically assume positions in contact with each other on the shaft and with the box forming a continuous liner or sleeve which may be forced in against the taper of the box to compensate for wear on the bearing surface, thereby keeping the bearing tight and the bearing surface true at all times and under all conditions.

My use of a polygonal figure in the bore of the box is primarily to avoid necessity for radial slots such as heretofore have been cut in similar journal boxes, to receive feathers or other projections on the liners or sleeves, in order to prevent turning of the latter in the box. Such use however, has the additional advantage already pointed out of making a uniform taper and a standard section from which a complete sleeve or liner can be built up.

My invention is illustrated in the accompanying drawings in which—

Figure 1 is a longitudinal sectional view of a complete journal box embodying my invention with a shaft shown therein in full lines.

Fig. 2 is an end view of the bearing with the cap removed.

Fig. 3 is an inner face view of the cap and Fig. 4 is a side view of the same.

Figs. 5, 6, 7 and 8 are respectively a perspective, a plan view, a side view, and a large-end view of one section of the sleeve or liner.

Referring to the drawings, B designates the journal box, provided with ears or lugs $b$ conveniently formed for attachment to the stern post or thrust abutment on a boat, or to the base or support of a stationary bearing. The box is provided with a taper bore $b'$ which is specifically illustrated as hexagonal (see Fig. 2). The outside of the box is of any desired shape, preferably cylindrical, threaded at its inner end to receive the cap C and a locking ring R.

The sleeve or liner which I use in this box may be of any suitable material, such as Babbitt metal or the like, but I prefer lignumvitæ, because among other things it gives the best results in water and especially in salt water. The sleeve is formed in the present case of six sections, each tapered with respect to all its longitudinal surfaces, with three straight sides and a curved inside forming an arc of the complete bearing. These sleeves are inserted around the shaft in the large end of the box, their straight backs being of the proper proportions to fit the sides of the hexagonal taper in the bore, and their straight sides abutting against each other, while their curved inner faces unite to form a cylindrical figure coaxial with the shaft S. In order to force the slips together, and produce as nearly as possible a continuous and homogeneous liner, the cap C is screwed down on the box, until its concentric internal annular flange $c$ is forced against the ends of all the slips, wedging them firmly into position. When the cap has been sufficiently set up, the ring R is screwed down upon it. Obviously this ring forms no direct part of the present invention and other locking means may be employed, as for example one or more screws, pins or keys, inserted through slots in the edge of the cap and taking into openings in the end of the box. Such locking devices are well known, and a number of alternative forms will readily occur to any person skilled in this art.

As wear occurs in this bearing, it may be compensated as long as the liner remains in serviceable condition, by simply screwing up the cap, which will thereby force the liner farther and farther into the box. By reason of the taper, practically the same conditions will always exist between the sections of the liner and between the liner and the shaft so that uniform efficiency is maintained. Simplicity and economy in manufacture as well as ease of assembly and repair are obvious because my entire sleeve or liner is made up by assembling a number of very simple units which are all the same, and interchangeable.

The liner as a whole is designated L, and its several sections (in Figs. 1 and 2) as $l'$, $l^2$, $l^3$, $l^4$, $l^5$ and $l^6$. In Figs. 5, 6, 7 and 8, since the individual unit slip is interchangeable with every other slip, the section illustrated is designated as $l'$.

I am aware that some changes may be made in this embodiment of my invention without departing from the spirit thereof and it is to be understood that I contemplate all non-essential changes and modifications which fairly fall within the scope of the appended claims.

Having thus described my invention what I claim and desire to secure by Letters Patent is:

1. A shaft bearing comprising a box with a tapered polygonal bore, and a sleeve or liner composed of a plurality of tapered slips assembled in the bore with their inner faces forming a cylindrical bearing surface, together with means attached to the box in overlapping relation to the tapered walls of the bore to force said slips into the bore around the shaft.

2. A shaft bearing comprising a box with a tapered polygonal bore, and a sleeve or liner composed of a plurality of tapered slips assembled in the bore with their inner faces forming a cylindrical bearing surface, together with a cap ring attached to the box in overlapping relation to the tapered walls of the bore and adapted to be forced against the ends of all the slips to wedge them tightly into the bore and around the shaft.

3. A shaft bearing comprising a box with a tapered polygonal bore, and a sleeve or liner composed of a plurality of tapered slips assembled in the bore with their inner faces forming a cylindrical bearing surface, together with a cap ring threaded on the outside of the end of the box and having an internal flange surrounding the shaft and abutting against the ends of all the slips, and adapted to wedge the same tightly into the bore and around the shaft as the ring is screwed down.

4. A shaft bearing comprising a box with a tapered polygonal bore, and a sleeve or liner composed of a plurality of tapered slips assembled in the bore with their inner faces forming a cylindrical bearing surface, together with a cap ring threaded on the outside of the end of the box and having an internal flange surrounding the shaft and abutting against the ends of all the slips, and adapted to wedge the same tightly into the bore and around the shaft as the ring is screwed down, and locking means for said cap.

5. In combination with a journal box having a tapered bore, a bearing sleeve or liner composed of interchangeable sections or slips, each tapered all over and a follower for said slips engaging said journal box in overlapping relation to the walls of said tapered bore.

In testimony whereof I affix my signature in presence of two witnesses.

HENRY CLARENDON MASTERS.

Witnesses:
A. C. JONES,
W. N. J. SKEEN.